(12) United States Patent
Barsness et al.

(10) Patent No.: US 8,774,057 B2
(45) Date of Patent: *Jul. 8, 2014

(54) QUERY EXECUTION AND OPTIMIZATION WITH AUTONOMIC ERROR RECOVERY FROM NETWORK FAILURES IN A PARALLEL COMPUTER SYSTEM WITH MULTIPLE NETWORKS

(71) Applicant: International Business Machines Corporation, Armonk, NY (US)

(72) Inventors: Eric L. Barsness, Pine Island, MN (US); David L. Darrington, Rochester, MN (US); Amanda E. Randles, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/786,441

(22) Filed: Mar. 5, 2013

(65) Prior Publication Data

US 2013/0179432 A1     Jul. 11, 2013

Related U.S. Application Data

(63) Continuation of application No. 11/834,823, filed on Aug. 7, 2007.

(51) Int. Cl.
*G06F 17/30* (2006.01)
(52) U.S. Cl.
USPC .......................................................... 370/255
(58) Field of Classification Search
USPC .................. 709/223–226; 370/255, 222, 217
See application file for complete search history.

(56) References Cited

U.S. PATENT DOCUMENTS

| | | |
|---|---|---|
| 5,371,852 A | 12/1994 | Attanasio et al. |
| 5,857,180 A | 1/1999 | Hallmark et al. |
| 6,081,801 A | 6/2000 | Cochrane et al. |
| 6,173,332 B1 | 1/2001 | Hickman |
| 6,460,043 B1 | 10/2002 | Tabbara et al. |
| 7,343,418 B2 | 3/2008 | Herley |
| 2002/0143755 A1 | 10/2002 | Wynblatt et al. |
| 2002/0194173 A1 | 12/2002 | Bjornson et al. |

(Continued)

FOREIGN PATENT DOCUMENTS

JP     2002135330 A     5/2002

OTHER PUBLICATIONS

Eric L. Barsness et al, U.S. Appl. No. 12/127,077 "Utilizing Virtual Private Networks to Provide Object Level Security on a Multi-Node Computer System", filed May 27, 2008.

(Continued)

*Primary Examiner* — Thai Nguyen
(74) *Attorney, Agent, or Firm* — Martin & Associates, LLC; Bret J. Petersen

(57) ABSTRACT

A database query execution monitor determines if an network error or low performance condition exists and then where possible modifies the query. The query execution monitor then determines an alternate query execution plan to continue execution of the query. The query optimizer can re-optimize the query to use a different network or node. Thus, the query execution monitor allows autonomic error recovery for network failures using an alternate query execution. The alternate query execution could also be determined at the initial optimization time and then this alternate plan used to execute a query in the case of a particular network failure.

7 Claims, 5 Drawing Sheets

(56) References Cited

U.S. PATENT DOCUMENTS

| | | |
|---|---|---|
| 2002/0198867 A1 | 12/2002 | Lohman et al. |
| 2003/0037048 A1 | 2/2003 | Kabra et al. |
| 2005/0097078 A1 | 5/2005 | Lohman et al. |
| 2005/0165748 A1 | 7/2005 | Ting et al. |
| 2007/0053283 A1 | 3/2007 | Bidwell et al. |
| 2008/0028379 A1 | 1/2008 | Stichnoth |
| 2009/0089544 A1 | 4/2009 | Liu |

OTHER PUBLICATIONS

Eric L. Barsness et al., U.S. Appl. No. 11/834,816 "Query Optimization in a Parallel Computer System with Multiple Networks", filed Aug. 7, 2007.

Eric L. Barsness et al., U.S. Appl. No. 11/834,823 "Query Execution and Optimization with Autonomic Error Recovery from Network Failures in a Parallel Computer System with Multiple Networks", filed Aug. 7, 2007.

Eric L. Barsness et al., U.S. Appl. No. 11/834,827 "Query Execution and Optimization Utilizing a Combining Network in a Parallel Computer System", filed Aug. 7, 2007.

Eric L. Barsness et al., U.S. Appl. No. 11/861,343 "Inserting Data Into an In-Memory Distributed Nodal Database", filed Sep. 26, 2007.

Amsaleg et al., "Scrambling Query Plans to Cope with Unexpected Delays", Parallel and Distributed Information Systems, 1996, Fourth International Conference on Miami Beach, FL, USA Dec. 18-20, 1996, Los Alamitos, CA, USA, IEEE Computer Society, US, Dec. 18, 1996, pp. 208-219.

Knoblock, Craig A., "Planning, Executing, Sensing, and Replanning for Information Gathering", 1995, http://www.isi.edu/info-agents/papers/knoblock95-ijcal.pdf.

Ives et al., "An Adaptive Query Execution System for Data Integration", SIGMOD RECORD, ACM, New York, NY, US, vol. 28, No. 2, Jun. 1, 1998, pp. 299-310.

Getta, Janusz R., "Query Scrambling in Distributed Multidatabase Systems", Database and Expert Systems Applications, 2000, Proceedings of the 11th International Workshop on Sep. 4-8, 2000, Piscataway, NJ, USA, IEEE, Sep. 4, 2000, pp. 647-652.

Vossough et al., "Block Level Query Scrambling Algorithm Within Distributed Multi-Database Environment", Database adn Expert Systems Applications, 2001, Proceedings of the 12th International Workshop on Sep. 3-7, 2001, Piscataway, NJ, USA, IEEE< Sep. 3, 2001, pp. 123-127.

Google, Inc. "define topology—Google Search" Feb. 23, 2010, Google.com, p. 1-2.

Eric L. Barsness et al., U.S. Appl. No. 13/786,335 "Query Optimization in a Parallel Computer System to Reduce Network Traffic", filed Mar. 5, 2013.

Eric L. Barsness et al., U.S. Appl. No. 11/834,813 "Query Optimization in a Parallel Computer System to Reduce Network Traffic", filed Aug. 7, 2007.

Eric L. Barsness et al., U.S. Appl. No. 13/786,365 "Query Optimization in a Parallel Computer System to Reduce Network Traffic", filed Mar. 5, 2013.

Eric L. Barsness et al., U.S. Appl. No. 13/786,390 "Query Optimization in a Parallel Computer System with Multiple Networks", filed Mar. 5, 2013.

Eric L. Barsness et al., U.S. Appl. No. 13/786,404 "Query Optimization in a Parallel Computer System with Multiple Networks", filed Mar. 5, 2013.

Eric L. Barsness et al., U.S. Appl. No. 13/786,430 "Query Execution and Optimization with Autonomic Error Recovery from Network Failures in a Parallel Computer System with Multiple Networks", filed Mar. 5, 2013.

Employees 500

| E_ID | Name | Salary | Start Date | |
|---|---|---|---|---|
| 88 | Joe | 45K | | 510A |
| 89 | Sam | 75K | | 510B |
| 90 | Tom | 78K | | 510B |
| 91 | George | 35K | | 510B |
| | | | | 510N |

FIG. 5

Managers 600

| E_ID | Department | |
|---|---|---|
| 89 | Accounting | 610A |
| 90 | Production | 610B |

(Select E_ID From Managers) ⇒ "89", "90"
612    614

710 → Select * from Employees
720 → Where E_ID Not In
730 →     (Select E_ID From Managers)

QUERY EXECUTION AND OPTIMIZATION WITH AUTONOMIC ERROR RECOVERY FROM NETWORK FAILURES IN A PARALLEL COMPUTER SYSTEM WITH MULTIPLE NETWORKS

CROSS-REFERENCE TO PARENT APPLICATION

This application is a continuation of U.S. Ser. No. 11/834,823 filed on Aug. 7, 2007, which is incorporated herein by reference.

BACKGROUND

1. Technical Field

This disclosure generally relates to database query execution and optimization, and more specifically relates to query execution and optimization with autonomic error recovery from network failures in a parallel computer system of multiple nodes and multiple networks.

2. Background Art

Databases are computerized information storage and retrieval systems. A database system is structured to accept commands to store, retrieve and delete data using, for example, high-level query languages such as the Structured Query Language (SQL). The term "query" denominates a set of commands for retrieving data from a stored database. The query language requires the return of a particular data set in response to a particular query.

Many large institutional computer users are experiencing tremendous growth of their databases. One of the primary means of dealing with large databases is that of distributing the data across multiple partitions in a parallel computer system. The partitions can be logical or physical over which the data is distributed.

Massively parallel computer systems are one type of parallel computer system that have a large number of interconnected compute nodes. A family of such massively parallel computers is being developed by International Business Machines Corporation (IBM) under the name Blue Gene. The Blue Gene/L system is a scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack. The Blue Gene/L supercomputer communicates over several communication networks. The compute nodes are arranged into both a logical tree network and a 3-dimensional torus network. The logical tree network connects the computational nodes so that each node communicates with a parent and one or two children. The torus network logically connects the compute nodes in a three-dimensional lattice like structure that allows each compute node to communicate with its closest 6 neighbors in a section of the computer.

In massively parallel computer systems such as the Blue Gene parallel computer system, recovering from hardware failures is important to more efficiently utilize the computer system. Recovering from a failure may allow a sophisticated application to continue to operate on different portions of the system or at a reduced speed to prevent the total loss of accumulated data prior to the failure that would result from restarting the system.

Database query optimizers have been developed that evaluate queries and determine how to best execute the queries based on a number of different factors that affect query performance. In the related applications, a query optimizer rewrites a query or optimizes query execution for queries on multiple networks. On parallel computer systems in the prior art, the database and query optimizer are not able to effectively overcome a failure of a network while executing a query. Without a way to more effectively execute and optimize queries, multiple network computer systems will continue to suffer from inefficient utilization of system resources to overcome network failures and process database queries.

SUMMARY

In a networked computer system that includes multiple nodes and multiple networks interconnecting the nodes, a database query execution monitor determines if a network error or low performance condition exists and then where possible modifies the query. The query optimizer then determines an alternate query execution plan to continue execution of the query. The query optimizer can re-optimize the query to use a different network or node. When a query encounters problems on a given network, the query can be restarted using a different network in the topology without user intervention for a seamless execution of the query. Thus, the query execution monitor allows autonomic error recovery for network failures where the query optimizer determines an alternate query execution plan. The alternate query execution could also be determined at the initial optimization time and then the alternate plan used to execute a query in the case of a particular network failure.

The disclosed examples herein are directed to a massively parallel computer system with multiple networks but the claims herein apply to any computer system with one or more networks and a number of parallel nodes.

The foregoing and other features and advantages will be apparent from the following more particular description, as illustrated in the accompanying drawings.

BRIEF DESCRIPTION OF DRAWINGS

The disclosure will be described in conjunction with the appended drawings, where like designations denote like elements, and:

FIG. 5 is a block diagram of a database table for an example modifying a query that is partially completed at the time of a network failure;

FIG. 6 is a block diagram of a database table with information that is extracted from the table by partial execution of the query shown in FIG. 7 executed against the database table shown in FIG. 5;

FIG. 7 is a query that executes on the database tables shown in FIGS. 5 and 6 to illustrate an example of modifying a query after partial execution before a network failure;

FIG. 10 is a method flow diagram to create and update network file records that are used by the query execution monitor and the query optimizer.

DETAILED DESCRIPTION

1.0 Overview

Figure 1:
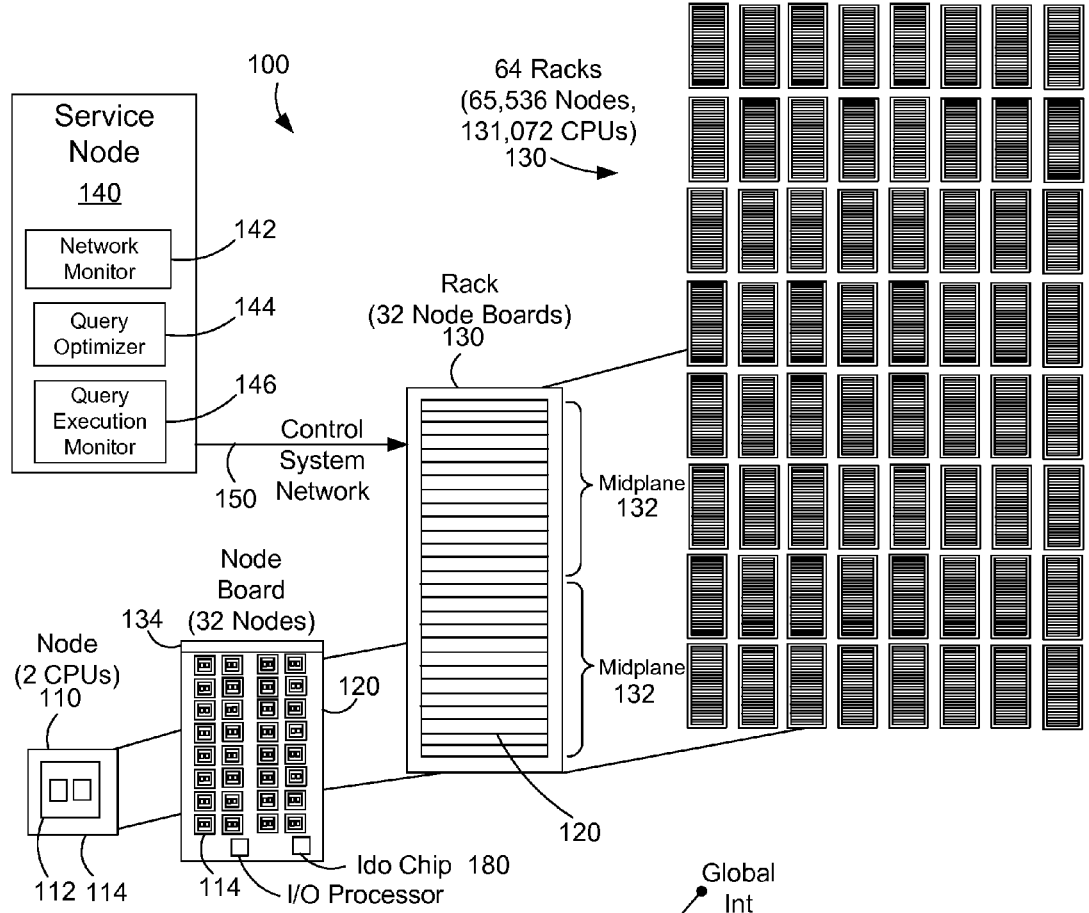
FIG. 1 is a block diagram of a computer with a query optimizer that rewrites a query to take advantage of multiple nodes and multiple network paths of a parallel computer system.

The disclosure and claims herein are related to query optimizers that develop and optimize how a query accesses a database. For those not familiar with databases, queries, and optimizers, this Overview section will provide additional background information.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, let's assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix. One popular way to define a query uses Structured Query Language (SQL). SQL defines a syntax for generating and processing queries that is independent of the actual structure and format of the database. When the database receives a query request, it produces an access plan to execute the query in the database. The access plan may be stored in a plan cache for use with subsequent queries that use the same access plan. In the prior art, a tool known as a query optimizer evaluates expressions in a query and optimizes the query and generates the access plan to access the database.

Query optimizers can also be utilized in a parallel computer system. This application and claims are directed to a database query optimizer that is invoked by a query execution monitor. The query optimizer re-optimizes a query to overcome a network failure as describe further below.

2.0 Detailed Description

In a networked computer system that includes multiple nodes and multiple networks interconnecting the nodes, a database query execution monitor determines if an network error or low performance condition exists. Where possible, the query is modified and then the query optimizer determines an alternate query execution plan to continue execution of the query. The query execution monitor allows autonomic error recovery for network failures where the query optimizer determines an alternate query execution. The examples herein are directed to a query optimizer that executes on a massively parallel computer system such as a BlueGene supercomputer.

The BlueGene supercomputer family developed by IBM includes thousands of compute nodes coupled together via multiple different networks. In the BlueGene architecture, the torus and logical tree networks are independent networks, which means they do not share network resources such as links or packet injection FIFOs. When nodes are interconnected with different independent networks, as in the case of the BlueGene architecture, the use of one or more networks can affect the performance of database queries that include resources on one or more nodes and networks. A query optimizer can now take advantage of multiple networks when executing a database query. Known query optimizers take many things into consideration when optimizing a database query, but no known query optimizer has optimized queries by rewriting or optimizing the query to execute on multiple networks to optimize performance of a network and the query.

The detailed description is given with respect to the Blue Gene/L massively parallel computer being developed by International Business Machines Corporation (IBM). However, those skilled in the art will appreciate that the mechanisms and apparatus of the disclosure and claims apply equally to any parallel computer system with multiple nodes and networks.

FIG. 1 shows a block diagram that represents a massively parallel computer system 100 that incorporates many of the features in the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical tree network and also have functional wide area network capabilities through a gigabit ethernet network (not shown). The gigabit Ethernet network is connected to an I/O processor (or Blue Gene/L link chip) 170 located on a node board 120 that handles communication from the service node 140 to a number of nodes. The Blue Gene/L system has one or more I/O processors 170 on an I/O board (not shown) connected to the node board 120. The I/O processors can be configured to communicate with 8, 32 or 64 nodes. The service node uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 manages the control system network 150 dedicated to system management. The control system network 150 includes a private 100-Mb/s Ethernet connected to an Ido chip 180 located on a node board 120 that handles communication from the service node 140 to a number of nodes. This network is sometime referred to as the JTAG network since it communicates using the JTAG protocol. All control, test, and bring-up of the compute nodes 110 on the node board 120 is governed through the JTAG port communicating with the service node.

The service node 140 includes a network monitor 142. The network monitor 142 comprises software in the service node and may include software in the nodes. The service node 140 further includes a query optimizer 144. The query optimizer 144 may execute on the service node and/or be loaded into the nodes. The service node 140 also includes a query execution monitor 146 that monitors execution of a query and consults the network monitor to determine if a query is executing or if there is a network error. The network monitor 142, the query optimizer 144, and the query execution monitor are described more fully below.

Figure 2:
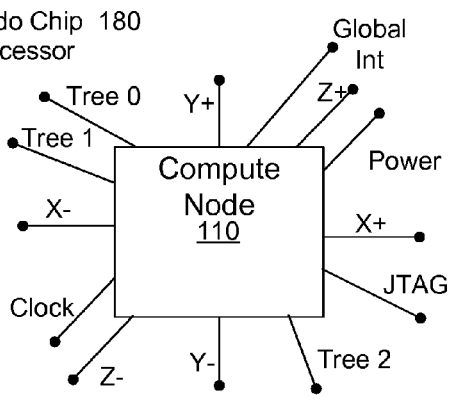
FIG. 2 is a block diagram of a compute node to illustrate the network connections to the compute node.

The Blue Gene/L supercomputer communicates over several communication networks. FIG. 2 shows a block diagram that shows the I/O connections of a compute node on the Blue Gene/L computer system. The 65,536 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. In FIG. 2, the torus network is illustrated by the X+, X−, Y+, Y−, Z+and Z− network connections that connect the node to six respective adjacent nodes. The tree network is represented in FIG. 2 by the tree0, tree1 and tree2 connections. Other communication networks connected to the node include a JTAG network and a the global interrupt network. The JTAG network provides communication for testing and control from the service node 140 over the control system network 150 shown in FIG. 1. The global interrupt network is used to implement software barriers for synchronization of similar processes on the compute nodes to move to a different phase of processing upon completion of some task. Further, there are clock and power signals to each compute node 110.

Figures 3, 4:
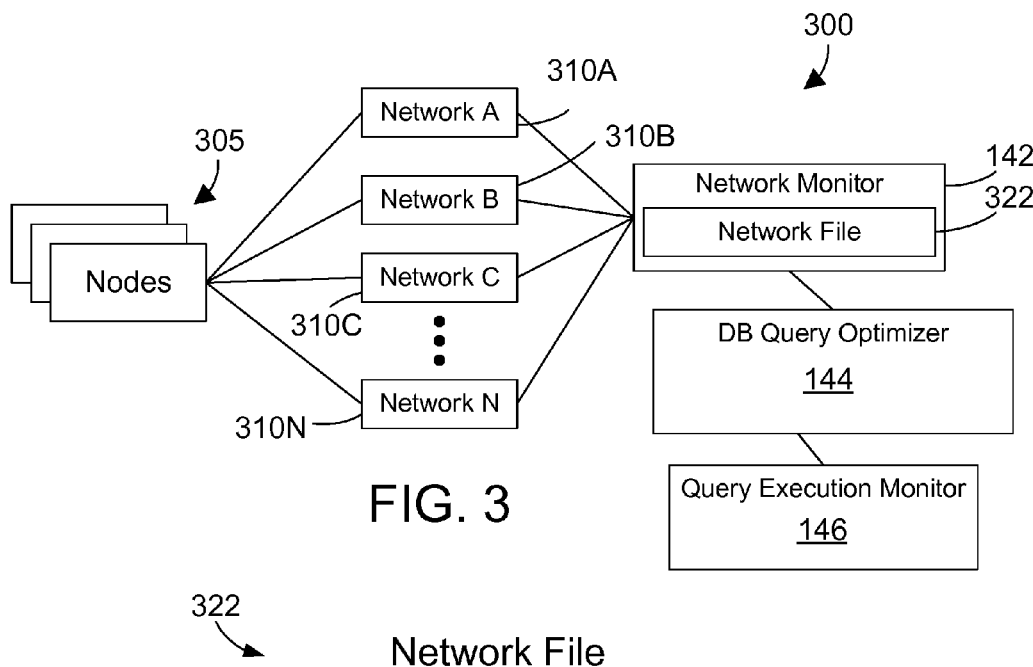
FIG. 3 is a block diagram representing a query optimizer system.
FIG. 4 is a block diagram of a network file record that contains information about network utilization.

Referring to FIG. 3, a system 300 is shown to include multiple nodes 305 coupled together via multiple networks 310A, 310B, 310C, . . . , 310N. The system 300 represents a portion of the computer system 100 shown in FIG. 1. The multiple networks are also coupled to a network monitor 142 that monitors the networks and logs the network characteristics in a network file 322. The network monitor 142 provides input data to the query optimizer (or optimizer) 144. In the preferred implementation, the multiple networks are independent networks so a problem with one network does not affect the function of a different network. However, networks that are dependent may also be used. The query execution monitor 146 is connected to the query optimizer and monitors execution of a query and determines if a query is executing properly or if there is a network error. The query execution monitor is described more fully below The query execution monitor 146 monitors execution of a query. The execution monitor 146 may be incorporated as part of a database engine or a stand-alone software operating on the service node 140 and/or the compute node 110 (FIG. 1). The query execution monitor 146 monitors execution of a query and consults the network monitor to determine if a query is executing properly or if there is a network failure of some kind preventing completion of the query. A network failure can be a complete hardware failure of a single network or where a network can be considered failed due to significantly reduced performance. A network may be considered failed if the response time to complete a request is too large, or if a network parameter such as re-transmits, latency, connection resets and other like parameters are outside a given range or beyond a given threshold. The network monitor may store performance information for network resources as described below with reference to FIG. 4.

When the query execution monitor detects a failure as described above, the query execution monitor may then check if data from a partially completed query can be reused and the query re-written to use the data from the partially completed query. This process is described further below. The query execution monitor then invokes the query optimizer 144 to re-optimize the query to use a different network resource other than the network resource that failed. The query optimizer will then determine whether there are other networks available to execute the query and then will develop an execution plan to optimize the query to use the alternate network resources. The related applications listed above provide additional methods and details for the query optimizer to select the alternate network resources to re-optimize the query. Alternatively, the query optimizer may develop alternate access plans for one or more potential failures at the time of initial optimization. The query optimizer then stores the alternate access plans until the query execution monitor detects the occurrence of a failure associated with one of the alternate access plans.

FIG. 4 illustrates an information structure for storing performance information that can be used by the query optimizer to determine how to optimize queries over multiple nodes and networks in a parallel computer database system. FIG. 4 illustrates a network file 322 that is used by the query optimizer. The network file 322 is maintained by the network monitor 142 (FIGS. 1, 3). Network file 322 preferably includes multiple records as needed to record status information about the networks in the computer system. The illustrated network file 322 has records 410A, 410B, and 410C. The network file records 410A through 410C contain information such as the network identifier (ID), a time stamp, current utilization, future utilization, network availability, latency and the percentage of retransmits. The current utilization represents how busy the network is in terms of bandwidth utilization at the time of the timestamp. Where possible, the future utilization of the network is predicted and stored. Similar to the node availability described above, the availability of the network indicates whether the network is available or not. Data stored in the network file 322 includes historical and real time information about the network status and loading.

FIGS. 5, 6 and 7 illustrate an example of autonomic error recovery from a network failure with query re-optimization. FIG. 5 represents a database table 500 named "Employees". The database table 500 has rows of data 510A-510N where each row holds data for an individual employee. The last row 510N is blank but represents that there may in fact be mores rows in the database but it is abbreviated for clarity. Each row of data 510A-510N includes an employee identification number (E_ID), name, salary and start data of the employee represented in that row. Similarly, FIG. 6 shows a database table named Managers 600. The Managers table 600 includes a list of employee IDs and departments managed for employees that are also managers. The Managers table 600 has a record 610A for an accounting department manager with an employee ID of "89", and a record 610B for a production department manager with an employee ID of "90".

FIG. 7 shows a query 700 for illustrating an example of a query executing to partial completion before a network failure is detected by the query execution monitor. The query 700 operates on the Employee 500 and Manager 600 tables described above with reference to FIGS. 5 and 6. The query 700 selects all records from the Employees database 500 that are not managers. To accomplish this, the query selects 710 employees from the Employees database 500 where the employee ID 720 is not found in the second select statement 730. The second select statement 730 returns all the Managers IDs from the Managers database 600. Thus, the second select statement 730 operating on the Managers database 600 returns 612 the data A89" and A90" 614 as shown in FIG. 6.

Figure 8:
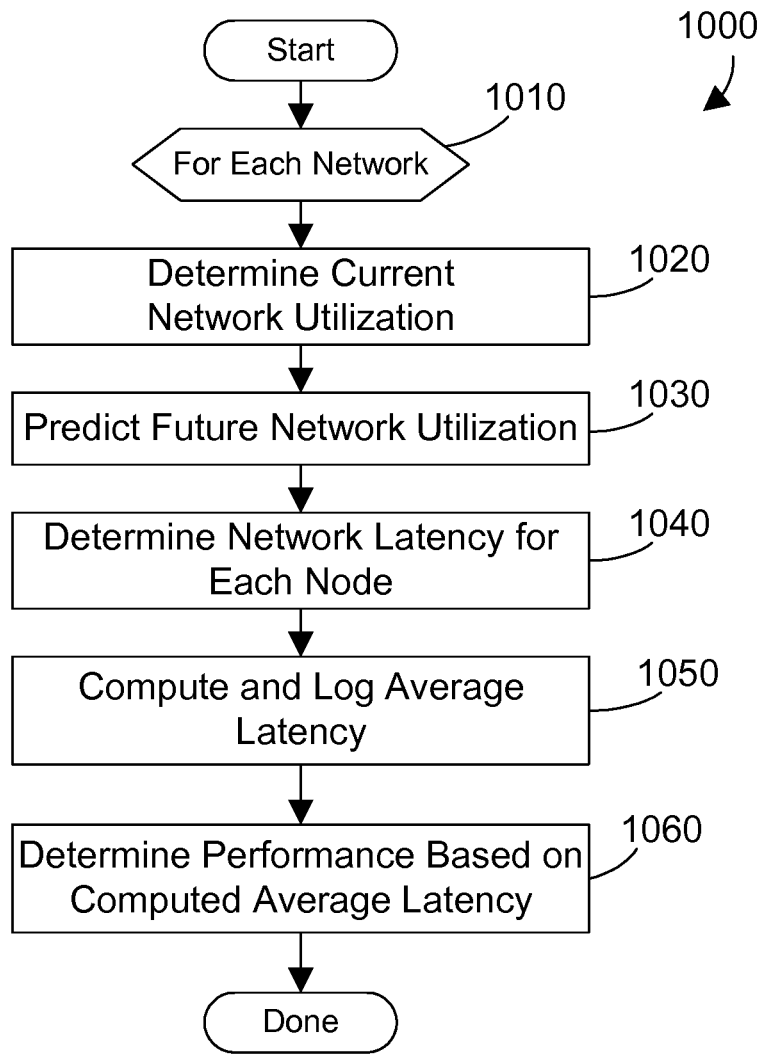
FIG. 8 is a modified version of the query shown in FIG. 7.

When part of a query has completed execution before a network failure occurs, the query execution monitor will determine whether the query can be rewritten to conserve the completed portion of the query. In the illustrated example above, if the second select statement of the query is complete, then the data 614 for this completed portion of the query can be conserved by rewriting the query. FIG. 8 shows the rewritten query 800, where the data 614 from the select statement is included as literal values 810 from the query run previously. In the alternative, the rewritten query 800 may include a pointer to a temporary data structure that contains the data 614 from the second select statement.

Figure 9:
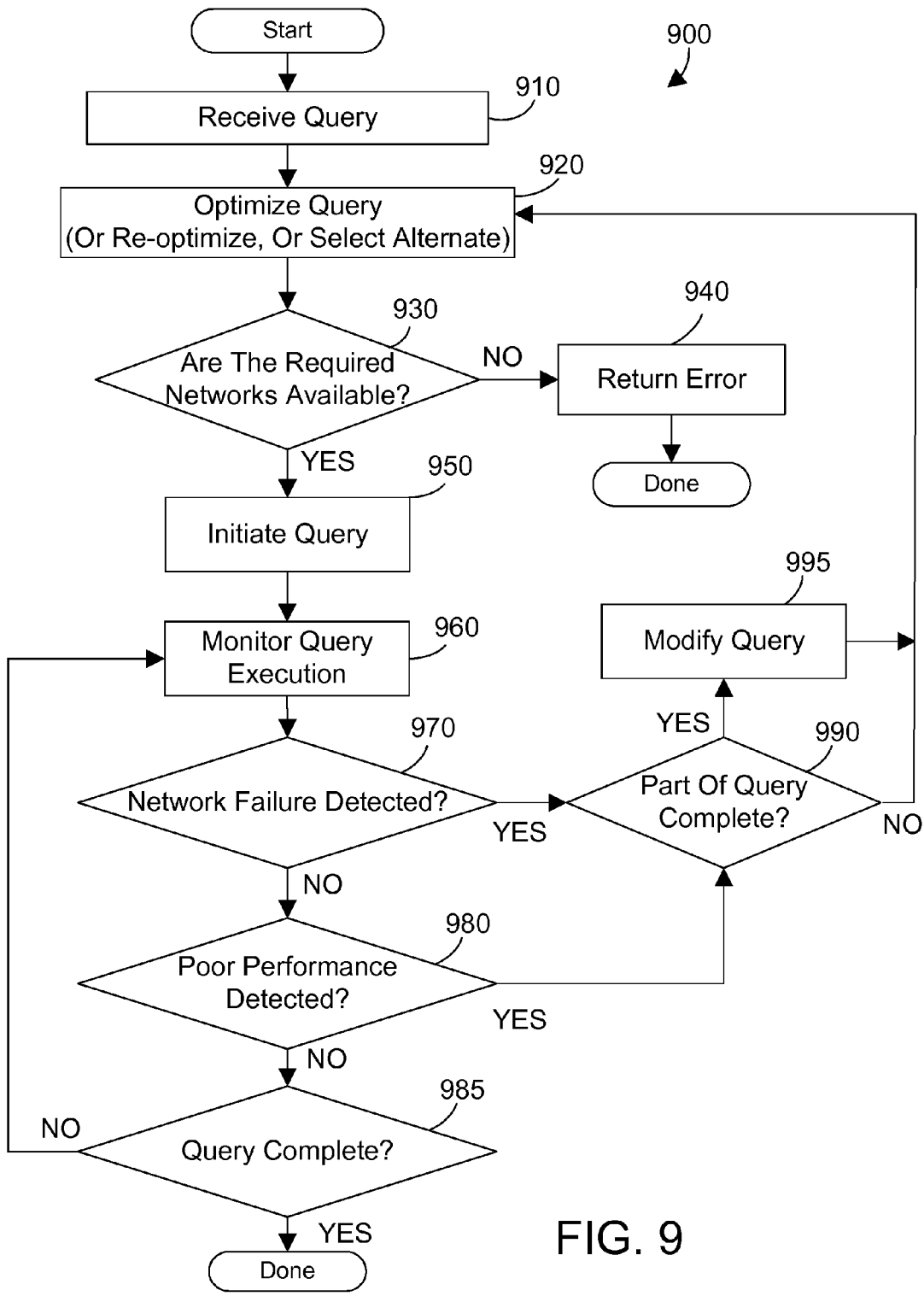
FIG. 9 is a method flow diagram for monitoring query execution and re-optimizing the query after detection of a network failure in a parallel database system.

FIG. 9 shows a method 900 for a query execution monitor to perform autonomic error recovery from a network failure with query re-optimization on a computer system with multiple nodes and multiple networks. The method 900 first receives a query (step 910). Next, optimize the query in the manner known or as described in the related applications (step 920), alternatively, optimize the query with alternative access plans that can be used when network failures are encountered as described above. Further, on subsequent loops to step 920, re-optimize the query for the detected network failure to use an alternate network resource. If the required networks are not available (step 930=no) then return an error (step 940) and the method is done. If the networks are available (step 930=yes) then initiate the query (step 950). The query execution monitor then monitors the query execution (step 960). The query execution monitor monitors the query to detect the three conditions listed in the next three question blocks (step 970, 980, 985). If a network failure is detected (step 970=yes) then go to step 990. If poor performance of the query execution is detected (step 980=yes) then go to step 990. If the query is not complete (step 985=no) then continue monitoring the query execution (step 960). If the query is complete (step 985=yes) then the method is done. Continuing with step 990, check if the query is partially complete (step 990=yes) then modify the query if possible to save the completed portion of the query (step 995) and return to re-optimize the query (step 920). If part of the query is not complete (step 990=no) then return to re-optimize the query (step 920). After re-optimizing the query (step 920) then continue with the method flow as described above until the method is done.

FIG. 10 shows a method 1000 for the network monitor 142 in FIGS. 1 and 3 to determine network traffic and network characteristics. The method may be executed on the compute nodes or on the service node 140 shown in FIG. 1. This method is executed for each network to govern database query activity in the database. For each network (step 1010), determine the current network utilization (step 1020). If possible, future network utilization is predicted (step 1030). Future network utilization could be predicted based on previous statistics stored in the network file. Predicted future network utilization could also be based on history if the application has been run before or has an identifiable pattern, and could be based on information provided about the application. For example, certain types of applications traditionally execute specific types of queries. Thus, financial applications might execute queries to specific nodes while scientific applications execute queries to all of the nodes. The network latency for each node is determined (step 1040). The average latency is computed and logged (step 1050). The performance of the network may then be determined based on the computed average latency (step 1060). For example, if the computed average latency exceeds some specified threshold level, the network would be overloaded or not available, but if the computed average latency is less than or equal to the specified threshold level, the network would be available. Note that the determination of "network performance" by the network monitor in step 980 in FIG. 9 relates to whether the network is overloaded in step 1060 in FIG. 10, and may be determined using any suitable heuristic or criteria.

Method 1000 in FIG. 10 may be performed at set time intervals so the network characteristics are constantly updated regardless of when they are used. Of course, in the alternative method 1000 could be performed on-demand when the network characteristics are needed. The benefit of doing method 1000 on-demand when the network characteristics are needed is the data will be as fresh as it can be. The downside of doing method 900 on-demand when the network characteristics are needed is the delay that will be introduced by the network monitor 142 determining the network characteristics. Having the network monitor periodically gather the network characteristics means these characteristics are readily available anytime the query optimizer needs them. The period of the interval may be adjusted as needed to balance the performance of the system with concerns of the data being too stale.

The detailed description introduces a method and apparatus for a query execution monitor to monitor query execution on multiple networks in a parallel computer system. The query execution monitor determines whether there is a network failure and then uses the query optimizer to use a different network networks to complete the query. The query execution monitor allows a database system to better utilize system resources of a multiple network parallel computer system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer implemented method for optimizing a query on a parallel computer system comprising the steps of:
   receiving a query to a database;
   optimizing the query by generating an execution plan that includes using a network of a plurality of independent networks to execute the query;
   initiating the query execution;
   monitoring the query execution;
   monitoring the plurality of independent networks and recording information about network utilization for the plurality of independent networks in a network file;

detecting a network failure based on the information in the network file indicating a network resource is below a threshold; and in response to the detected network failure, optimizing to re-optimize the query by generating an alternate execution plan for the query to use a different independent network to execute the query where the different independent network is selected by the query optimizer based on the information in the network file; wherein the network file comprises: network ID, a timestamp; current utilization, future utilization, availability, latency, and retransmits.

2. The computer implemented method of claim 1 further comprising the step of determining that part of the query executed prior to the network failure and then modifying the query to utilize data from the part of the query that executed prior to the network failure, where the modifying the query step is done prior to re-optimizing the query.

3. The computer implemented method of claim 1 wherein the step of monitoring the query is done on a service node connected to a plurality of nodes of a massively parallel computer system with a plurality of network, and a network monitor in the service node periodically monitors the plurality of networks to determine the network failure.

4. The computer implemented method of claim 1 wherein the query optimizer re-optimizes the query for a potential failure and stores an alternate access plan to be used when the query execution monitor detects the occurrence of the potential failure.

5. A computer implemented method for optimizing a query on a massively parallel computer system comprising the steps of:
    receiving a query to a database in the massively parallel computer system having a plurality of compute nodes connected with a plurality of independent networks;
    optimizing the query by generating an execution plan that includes using a network of a plurality of independent networks to execute the query;
    initiating the query execution;
    monitoring the query execution on a service node connected to the plurality of compute nodes;
    monitoring the plurality of independent networks and recording information about network utilization for the plurality of independent networks in a network file;
    detecting a network failure based on the information in the network file indicating a network resource is below a threshold; and
    in response to the detected network failure, re-optimizing the query by generating an alternate execution plan for the query to use a different independent network to execute the query where the different independent network is selected by the query optimizer based on the information in the network file; and
    wherein the network file information comprises: a network ID, a timestamp, current utilization, availability, latency and retransmits.

6. The computer implemented method of claim 5 further comprising the step of determining that part of the query executed prior to the network failure and then modifying the query to utilize data from the part of the query that executed prior to the network failure, where the modifying the query step is done prior to re-optimizing the query.

7. The computer implemented method of claim 5 wherein the query optimizer re-optimizes the query for a potential failure and stores an alternate access plan to be used when the query execution monitor detects the occurrence of the potential failure.

* * * * *